United States Patent [19]

Klingel

[11] 4,382,170

[45] May 3, 1983

[54] THERMAL CUTTING JET DEVICE WITH SUCTION APPARATUS

[75] Inventor: Hans Klingel, Simsbury, Conn.

[73] Assignee: Trumpf GmbH & Co., Fed. Rep. of Germany

[21] Appl. No.: 242,712

[22] Filed: Mar. 11, 1981

[30] Foreign Application Priority Data

Aug. 30, 1980 [DE] Fed. Rep. of Germany ....... 3032728

[51] Int. Cl.³ .............................................. B23K 9/00
[52] U.S. Cl. ...................... 219/121 PP; 219/121 PM; 219/121 PN; 219/137.41; 239/132; 239/294
[58] Field of Search ...................... 219/137.41, 137.62, 219/121 P, 121 PP, 121 PQ, 121 PM, 74, 75, 219/76.16; 228/46; 239/132, 132.1, 132.3, 294

[56] References Cited

U.S. PATENT DOCUMENTS

| | | | |
|---|---|---|---|
| 3,534,388 | 10/1970 | Ito et al. ......................... | 219/121 PP |
| 3,833,787 | 9/1974 | Couch, Jr. ..................... | 219/121 PP |
| 4,063,059 | 12/1977 | Brolund et al. ................ | 219/137.41 |
| 4,087,670 | 5/1978 | Miller ............................ | 219/121 PP |

FOREIGN PATENT DOCUMENTS 712216  2/1980  U.S.S.R. .......................... 219/137.41

Primary Examiner—M. H. Paschall
Attorney, Agent, or Firm—McGlew and Tuttle

[57] ABSTRACT

In plasma/water cutting, in order to reduce the space required, it is suggested to construct the thermal cutting jet device so that water, required particularly to constrict the plasma jet, is removed by means of an annular suction nozzle or a ring of annular suction bores arranged around the thermal cutting jet device. In order to reduce the resulting noise, a spraying device can be arranged around the annular suction nozzle whose water is fed back to a tank either by a suction device for the cutting jet device, or by an additional suction device.

12 Claims, 2 Drawing Figures

THERMAL CUTTING JET DEVICE WITH SUCTION APPARATUS

FIELD AND BACKGROUND OF THE INVENTION

The present invention relates in general to plate cutting devices, and in particular to a new and useful processing machine for flat, particularly plate-shaped workpieces, which uses a thermal cutting jet device, particularly a plasma-cutting device, where the cutting jet device has an opening for the cutting jet and an opening concentric thereto, for the issuance of a liquid.

Such processing machines are already known, particularly as plasma cutting machines. Both a flame-cutting jet, hence a plasma jet, and a liquid jet, which surrounds the plasma jet concentrically issue from nozzles of these machines. The liquid jet has the function, on the one hand, of cooling the nozzle, and on the other hand, of constricting the plasma jet. This leads to an increase of the energy concentration in the jet, and has a number of advantages that are already known in the industry. The workpiece to be processed is carried on supports having a water-filled tank. The plasma water jet, which emerges on the underside of the workpiece when the workpiece is cut, is conducted directly into the water of the tank, where it cools off, while the water absorbs the gases, vapors and combustion residues carried along in the jet. It is readily understandable that the maximum size of the workpieces to be processed depends on the size of the tank since the nozzle moves over the workpieces to make the cuts. If this machine is designed for relatively large workpieces, it will require an enormous space. This is actually not justified for the processing of small workpieces, and any machine size will therefore represent principally a compromise solution. In one case it is unnecessarily larger, in another it will possibly be too small for processing a larger workpiece.

SUMMARY OF THE INVENTION

An object of the invention is to provide a processing machine of the above-described type which occupies as little a space as possible, while it imposes no limitations on the size of the workpiece, that is, it permits the processing of at least plate-shaped workpieces of the currently available maximum size.

For the solution of this size problem, the invention provides a processing machine which comprises means for moving a workpiece under a jet nozzle and suction means to the gases and liquid used.

In contrast to conventional "water-plasma cutting", the cutting jet device of the invention stands still in this processing machine, and the workpiece is displaced relative to the cutting nozzle and with the plane of the workpiece. The water, plasma and gases applied over the cutting jet device on the workpiece are not conducted into a tank, but are drained off again immediately, so that this processing machine requires very little space. The space requirement corresponds, for example, to that of a conventional stamping or nibbling machine on which plate shaped workpieces are processed mechanically.

The device for moving the workpiece within its plane can therefore be designed exactly as in conventional stamping and/or nibbling machines, so that no further explanation is set forth here. A cross support-type adjusting device is preferred, as is described and represented schematically in the shown embodiment. The maximum workpiece size is therefore determined exclusively by the maximum amount of longitudinal and transverse displacement which can be provided by a workpiece displacement device. The costs for draining the water are minimal, and insignificant compared to those incurred with a tank. Another advantage is that, due to the layout of a stamping or nibbling machine, such a machine can easily be extended or retrofit with a thermal cutting device to form a combined machine.

According to a preferred embodiment of the invention, an imaginary central face or cross sectional plane of a suction nozzle or the center lines of suction bores have the form of a truncated cone or rest on an imaginary truncated cone whose smaller diameter is associated with the workpiece support. That is the opposite annular walls of the annular nozzle converge toward workpiece 3. In this way, an outwardly and upwardly directed suction effect is produced, which ensures good drainage. Whether an annular suction nozzle or a ring of suction bores should be used, depends on the specific case and also depends to a certain extent on the size and power of the respective cutting device.

In a further embodiment of the invention, at least one suction pipe connected to a suction device opens into the inner end of the suction nozzle or into a ring conduit connecting suction bores, which can have at least partly the form of a fixed channel. It is also possible to design at least a part of the channel as a flexible hose line, particularly when the suction nozzle or the suction bores are arranged according to another embodiment of the invention on a pipe, concentrically surrounding the thermal cutting jet device, which is displaceable in the direction of its longitudinal axis. In this case, at least the part of the suction bore is moved with the pipe which is provided therein or secured thereon. The displaceability of the suction nozzle or suction bores permits the adaptation of the suction device to the space conditions provided by the workpiece and the cutting jet device. In addition, the suction device can be brought close to the workpiece, so that the suction can be optimally adjusted.

When not in use, for example, when workpieces are exchanged, the suction device can be lifted so that it is neither in the way nor can it be damaged. A particular advantage is that the free end of the displaceable pipe forms a supporting surface for the workpiece without limiting the mobility of the workpiece. The suction effect is therefore displayed solely in the space defined by the workpiece, the adjustable pipe, and the cutting jet nozzle.

The inlet opening of the suction nozzle or of the suction bores extends according to another feature of the invention, up to the free end of the displaceable pipe, so that they can drain off the water along the part of the workpiece underneath the pipe.

According to another preferred form of the invention, the suction device is surrounded concentrically by an annular spraying device for the production of a tubular water curtain. The curtain absorbs the noise, which is unavoidable in flame cutting, particularly in plasma cutting, so that this design considerably reduces the impairment of working conditions near the machine. In this connection another embodiment of the invention provides a suction device for the spray liquid which is arranged concentrically to the spraying device. This suction device is actually more important than that of the cutting jet liquid, because normally more spray liquid is required than cutting jet liquid.

Since the amount of spray liquid obtained per unit of time is not negligible and a collecting tank is deliberately not provided, the spray liquid must also be drained off. This can be done by means of the second suction device, or according to another feature of the invention, in that the suction device for the cutting jet liquid forms at the same time the suction device for the spray liquid. It requires only an additional suction nozzle or additional suction bores whose inner ends can also be connected, for example, to the ring conduit of the suction bores for the cutting jet liquid. The use of a double suction device need not necessarily be equally expedient in each embodiment. It depends on the specific case, on the respective amounts of water, the power of the suction device, and on various other components.

If a separate suction device is used for the spray liquid, it is preferably arranged concentrically outside the spraying device. An apron or a sealing ring can be provided at an even larger diameter if necessary which bears on the workpiece during the operation.

Accordingly, an object of the invention is to provide such a machine for processing flat workpieces which comprises, a support, jet nozzle means connected to the support for discharging a cutting jet for cutting the workpiece in a cutting area, liquid nozzle means connected to the support for discharging a liquid stream concentric with the cutting jet, concentrically mounted around the jet nozzle means, drive means for moving the workpiece in the plane thereof passed the jet nozzle means, and suction means connected to the support and concentric with the jet nozzle means, suction means including suction nozzle means concentric with the jet nozzle means for drawing up liquid and gases formed at the cutting area.

Another object of the invention is to provide such a machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
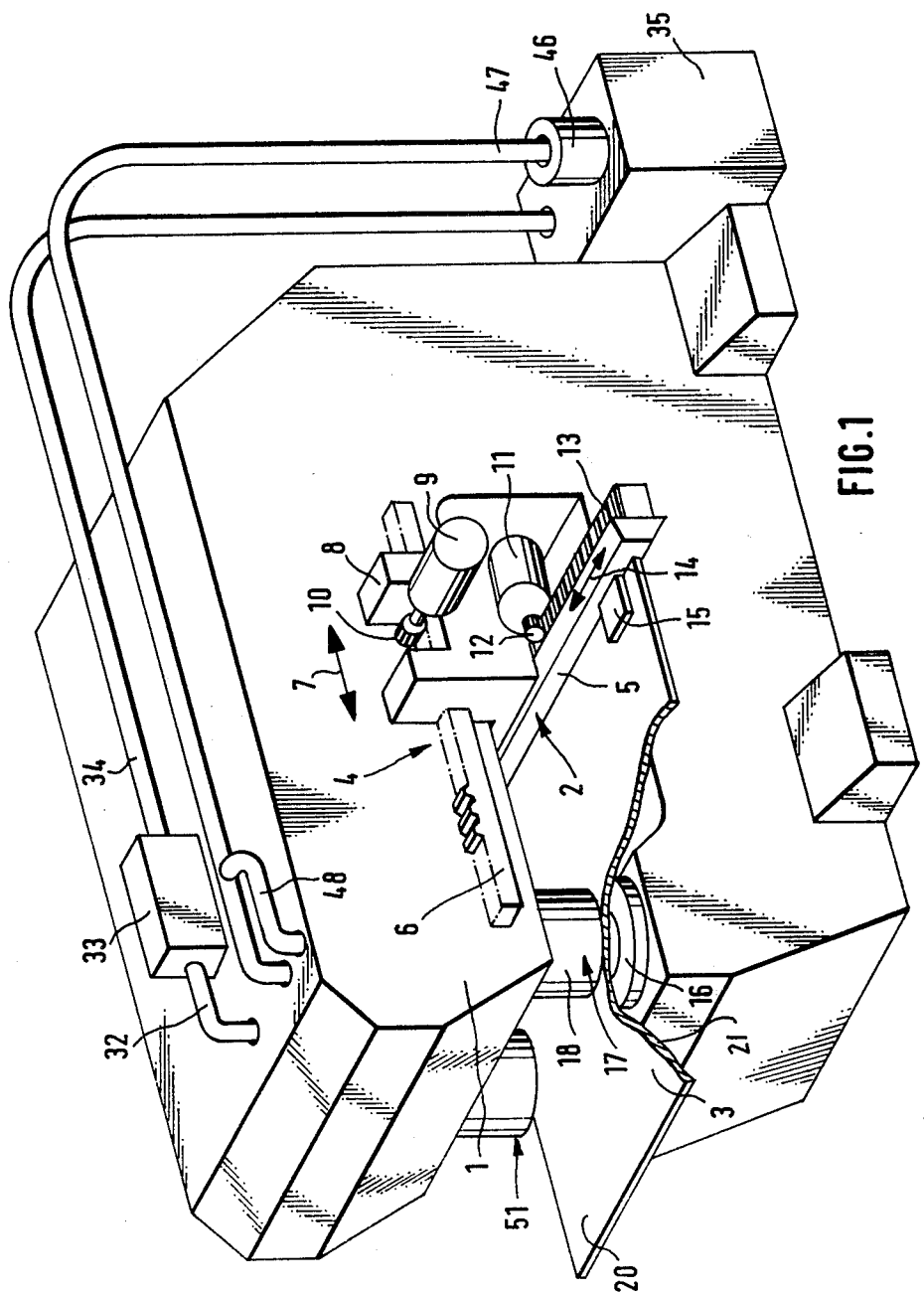
FIG. 1 is a perspective view of the processing machine in accordance with the invention.

Turning to the drawings in particular, the invention embodied therein, in FIG. 1 comprises, a machine for processing flat workpieces 3 which includes a machine support or body 1 which carries a cutting device 17 for cutting workpiece 3.

An X-Y coordinate guide device 2, for workpiece 3, is arranged on the C-shaped machine body 1, which comprises a longitudinal guide 4 and a transverse guide 5. Longitudinal guide 4 in turn consists of a guide rail 6 rigidly connected with machine body 1, and of a carriage 8 mounted for displacement in the direction of double arrow 7. The displacement is achieved preferably by means of a driving motor 9 which turns a pinion 10. The pinion 10 engages teeth of guide rail 6 which is designed as a rack.

Carriage 8 also carries a second driving motor 11 with pinion 12. Its teeth mesh with those of a bearing rail 13, which is likewise designed, at least partly, as a rack or holds such a rack. By means of the second driving motor 11, bearing rail 13 can be moved back and forth in the direction of double arrow 14. The directions of motion 7 and 14 are perpendicular to each other.

In bearing rail 13 are arranged preferably two pairs of claws 15 between which the plate-shaped workpiece 3, which may be sheet metal, is clamped, and of which one is shown in FIG. 1. It is readily understandable that the workpiece moves, by means of driving motor 11, in the direction of double arrow 14. If both motors 9, 11, run simultaneously, the result is a superposed longitudinal and transverse movement. Workpiece 3 bears in addition on bottom part 16 of a thermal cutting jet device 17, particularly a plasma-cutting device, whose top part is deisgnated 18. The jet device comprises a cutting jet nozzle 19, from which the cutting jet issues, and impinges on top side 20 of workpiece 3 and melts the workpiece at the respective point. Consequently the cutting jet issues again from underside 21 of the workpiece.

Figure 2:
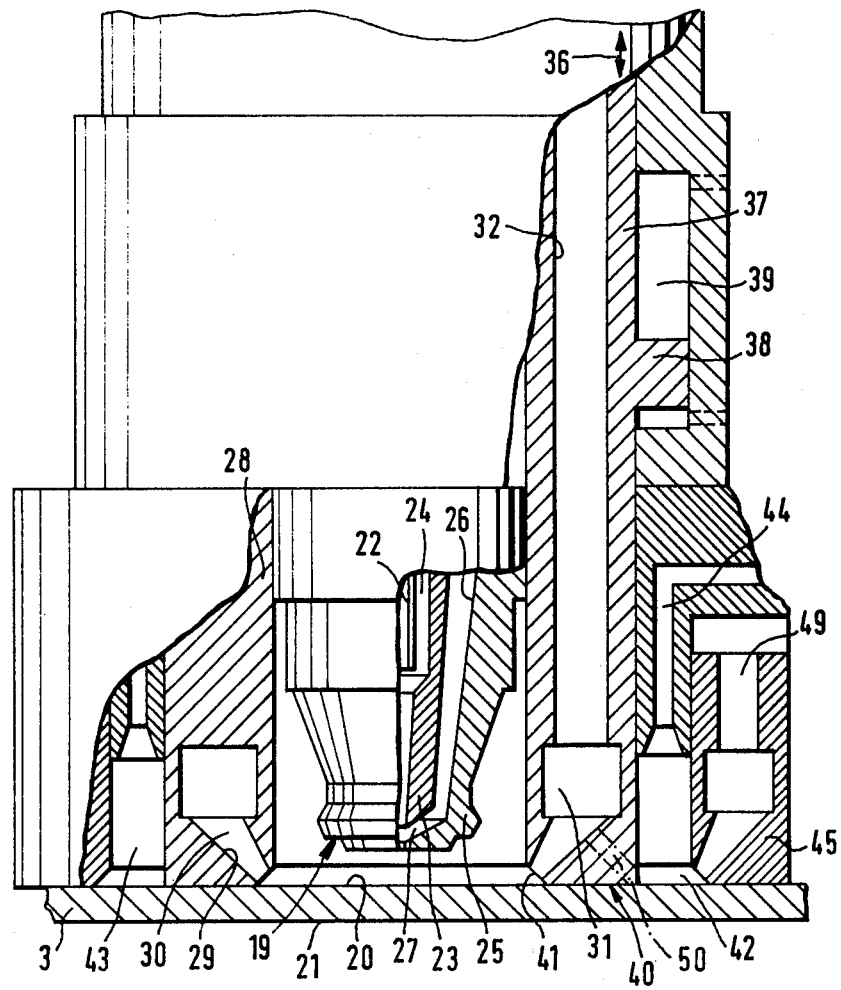
FIG. 2 is an enlarged elevational view partially in section of the nozzle parts of the device in FIG. 1.

Cutting jet nozzle 19 (FIG. 2) comprises an electrode 22, which is surrounded at a distance by guide tube 23 which surmounts it toward workpiece 3 and forms a wind tunnel 24 for the gas required for jet cutting. A counter electrode may be the workpiece itself or any other known arrangement. The inner end of guide tube 23 is connected over a line (not shown) to a gas tank. A nozzle body 25 surrounds guide tube 23 concentrically and at a distance, so that a channel 26 is formed for the supply of water. At its outlet end 27, the central diameter of channel 26 narrows so that the water jet impinges obliquely on the plasma jet. This leads in a known manner, to a contriction of the plasma jet and thus to an increase of the energy density thereof.

As a result both the plasma jet and the tubular water jet surrounding the plasma jet, strike the top side 20 of workpiece 3. In order to prevent this water from flowing off uncontrollably, a suction device 28 is arranged in this processing machine concentrically to thermal cutting jet device 17. This is in addition to the device for moving the workpiece. An essential part of this suction device is an annular suction nozzle 29 or a corresponding ring of suction bores, where an imaginary face 30 has the form of a truncated cone, in analogy to outlet end 27 for the water. Accordingly, the central lines of the suction bores would bear on such an imaginary truncated cone whose smaller diameter is associated with the workpiece support.

The inner end of the annular suction nozzle forms or opens into a ring conduit 31 which is connected over a suction pipe 32 to a suction pump 33. A line 34 (FIG. 1) leads from the latter to liquid tank 35. In the case of an annular arrangement of suction bores, a ring conduit 31 is also required.

In order to be able to bring the suction bores as close as possible to top side 20 of workpiece 3, and to vary the distance between the workpiece and the end of the cutting jet nozzle, if necessary, the suction nozzle or the suction bores with ring conduit 31 and at least a part of suction pipe 32 are arranged on a pipe or piston 37 which can be moved up and down in the direction of double arrow 36, and which surrounds the thermal cutting jet device 17. Pipe 37 carries an outer collar 38, which permits the displacement in connection with a hydraulic or pneumatic working cylinder 39. The free end 40 of the adjustable pipe forms a preferably plane supporting surface which bears somewhat tightly on top side 20 of the workpiece. It is seen from FIG. 2 that the inlet opening 41 of the suction nozzle or of the suction bores extends substantially up to the free end of the displaceable pipe, that is, approximately up to the free end 40 of displaceable pipe 37.

Suction device 28 is surrounded concentrically according to another feature of the invention by an annular spraying device 42 for the production of a tubular water curtain at 43. The spraying device is designed in a similar manner as suction device 28, but with the difference that line 44 is a feed pipe for the water from which the water curtain is to be formed. But because the water of the latter should not flow off uncontrolled, the annular spraying device 42 is surrounded with a second suction device 45, which corresponds principally to suction device 28. But this second suction device and the spraying device can also be made adjustable, if necessary, in the direction of double arrow 36. If suction device 28 is powerful enough, the water of the annular spraying device 42 can also be removed over suction device 28, as indicated symbolically by dot-dashed lines 50 in FIG. 2, or it can at least support this way the second suction device 45. Lines 50 show an additional annular opening or ring of bores which communicate with ring 31 in this case.

Pump 46 (FIG. 1) supplies water over line 47 into channel 26. Supply line 44 of annular spraying device 42 is supplied with pressurized water over a schematically represented branch line 48. In a similar manner, suction pipe 49 can be connected with suction pipe 32 in a manner not shown here, so that the water of water curtain 43 can likewise be drained off by means of suction pump 33.

Thermal cutting jet device 17 can advantageously be arranged at a lateral distance from a stamping or nibbling device shown schematically at 51, of the processing machine. In this case, the workpiece can be treated with this processing machine not only mechanically, but also alternately or additionally, thermally.

While a specific embodiment of the invention has been shown and described in detail to illustrate the application of the principles of the invention, it will be understood that the invention may be embodied otherwise without departing from such principles.

What is claimed is:

1. A machine for processing flat workpieces comprising:

a support;

a cutting jet nozzle connected to said support for discharging a cutting jet downwardly to cut a workpiece at a cutting location spaced above a workpiece to be cut;

liquid nozzle means connected to said support for discharging a liquid stream concentrically of the cutting jet, said liquid nozzle means mounted concentrically of said cutting jet nozzle;

drive means connected to said support for moving a workpiece in the plane of the workpiece and past said jet nozzle; and suction means connected to said support and concentrically mounted around said jet nozzle, and including suction nozzle means concentric of said jet nozzle for drawing up gas and liquid from the cutting area, said suction nozzle means being positioned closer to a workpiece to be cut than said jet nozzle during discharge of said cutting jet so as to place said suction nozzle means as close as possible to a workpiece to be cut.

2. A machine according to claim 1, wherein said suction nozzle means has an imaginary central plane in the shape of a truncated cone converging toward said jet nozzle.

3. A machine according to claim 1, wherein said suction nozzle means comprises an annular suction nozzle having opposite annular converging walls toward a workpiece to be cut, said annular suction nozzle converging radially inwardly toward said jet nozzle.

4. A machine according to claim 1, wherein said suction nozzle means comprises a plurality of circumferentially spaced individual suction nozzles distributed around said jet nozzle, said suction nozzles converging toward said jet nozzle and each suction nozzle having sidewalls converging toward a workpiece to be cut.

5. A machine according to claim 1, wherein said suction means comprises a pipe having said suction nozzle means defined therein, a ring conduit defined in said pipe communicating with said suction nozzle means and concentric around said jet nozzle, a suction line connected to said ring and a suction pump connected to said suction line.

6. A machine according to claim 1, including a pipe movably mounted in said support carrying at least a portion of said suction means and carrying said suction nozzle means, said pipe concentrically mounted around said jet nozzle, said jet nozzle movable with said pipe, said pipe displaceable to vary the distance between said jet nozzle and said suction nozzle means with a workpiece to be cut.

7. A machine according to claim 6, wherein said pipe has a face adapted to bear against and support a workpiece to be cut, said face disposed at a free lower end of said pipe.

8. A machine according to claim 7, wherein a suction inlet end of said suction nozzle means extends up to said free end face of said pipe.

9. A machine according to claim 1, including spray means connected to said support and concentrically mounted around said suction nozzle means for discharging a curtain of water around said jet nozzle.

10. A machine according to claim 9, including additional suction means connected to said support and concentrically mounted around said spray means for drawing water of the water curtain away from the cutting area.

11. A machine according to claim 9, wherein said suction nozzle means are shaped to additionally draw water from the water curtain discharged by said spray means away from the cutting area.

12. A machine according to claim 1, including mechanical cutting means mounted to said support at a lateral spacing from said jet nozzle for mechanically processing a flat workpiece.

* * * * *